United States Patent [19]
Cottet

[11] Patent Number: 4,504,127
[45] Date of Patent: Mar. 12, 1985

[54] FRAME FRONT FOR EYEGLASSES PERMITTING INTERCHANGEABILITY OF LENSES

[75] Inventor: Jackie Cottet, Morez, France

[73] Assignee: Cottet Freres, Morez, France

[21] Appl. No.: 356,441

[22] Filed: Mar. 9, 1982

[30] Foreign Application Priority Data

Apr. 14, 1981 [FR] France ................................ 81 07453

[51] Int. Cl.³ .......................... G02C 1/00; G02C 1/04; G02C 5/06
[52] U.S. Cl. ..................................... 351/86; 351/106; 351/126; 351/154
[58] Field of Search ...................... 351/47, 57, 86, 106, 351/126, 154

[56] References Cited
U.S. PATENT DOCUMENTS
4,176,921 12/1979 Matthias ............................ 351/47 X Primary Examiner—John K. Corbin
Assistant Examiner—Rodney B. Bovernick
Attorney, Agent, or Firm—Charles E. Brown

[57] ABSTRACT

There is disclosed a frame front for eyeglasses permitting interchanging of lenses without any tool. The frame front comprises a main bridge member connecting lens supports and a median bridge member extending between the lens supports but disconnected therefrom. The median bridge member has retaining notches at its opposed ends for receiving peripheral portions of the lenses and their associated lens supports. The retaining notches define an abutment position in which the lenses are retained on their supports and a limit position permitting removal of the lenses through openings formed by the notches. The lens supports are resiliently mounted by the main bridge member to permit displacement outwardly and upwardly from the abutment position to the limit position.

12 Claims, 6 Drawing Figures

FRAME FRONT FOR EYEGLASSES PERMITTING INTERCHANGEABILITY OF LENSES

FIELD OF THE INVENTION

The present invention relates generally to frame fronts for eyeglasses or spectacles and more particularly to such frame fronts permitting interchangeability of lenses.

PRIOR ART

U.S. Pat. No. 4,176,921 issued Dec. 4, 1979 teaches a frame front which permits interchanging lenses. According to this patent the frame front has a pair of lens suoport sections joined by an upper or main bridge member and a lower bridge member. Each of the lens support sections has a plurality of support prongs for receiving the lenses. At least one prong has a retaining position for retaining the lenses in mounted relation and a nonretaining position in which the lenses are not retained by the retaining prongs for easy removal.

Two such retaining prongs are provided (one for each lens) and the prongs are fixed to a retaining clip which in turn is pivotally mounted about the axis of the upper bridge member and latched on the lower bridge member in the retaining position.

Such a frame front offers the possibility of easy changing of lenses whenever necessary, for example by replacing tinted lenses with nontinted lenses by simply pivoting the retaining clip without the need for any special tool or instrument.

Nonetheless, from the standpoint of manufacture the assembly of the retaining clip on the upper bridoe member and the latching connection between the retaining clip and the lower bridge member give rise to various meticulous operations which necessarily substantially effect the ultimate cost of the resulting frame front.

OBJECT AND SUMMARY OF THE INVENTION

An object of the present invention is to provide a frame front for eyeglasses or spectacles permitting the interchangeability of lenses, having a simplified construction relative to the prior art and a lower production cost.

According to the invention there is provided a frame front comprising two lens supports or rims, a main bridge member connecting the lens supports, a median bridge member extending between the lens supports. Each of the lens supports has a plurality of prongs for receiving a lens. The frame front is characterized by each of the lens supports being disconnected from the median bridge member and freely engageable in a retaining notch provided on the median bridge member. The main bridge member is elastically deformable for disengaging the lower bridge member to mount or remove lenses.

Preferably the median bridge member is fixed to a support member depending from the main bridge member. Median bridge member is substantially parallel to the main bridge member and is located at a level intermediate the main bridge member and the nosepieces.

Each of the ends of the median bridge member has a retaining jaw for holding captive a peripheral portion of the lens support and a peripheral portion of the lens. Since the lens supports are fixed to the main bridge member and disconnected from the median or secondary bridge member, the elasticity of the main bridge member may be utilized to displace the lens supports outwardly from their normal planes. Such a displacement to the lens supports permits lenses to be disengaged from the jaws and thereby frees the lenses which may thereupon be removed.

A frame front embodying the invention has the advantage of being extremely simple with a relatively small number of parts. Also, the securement of the lenses is reliable and practical since the lenses may be removed or mounted independently of each other, thereby making the lens changing operation easy and very greatly reducing the risk of the lens being dropped and broken.

It will also be noted that such frame front is particularly economical to manufacture and assemble.

These and other features and advantages will become apparent from the description which follows, given by way of example, with reference to the accompanying drawings.

DESCRIPTION OF THE PREFERRED EMBODIMENTS

Figure 1:
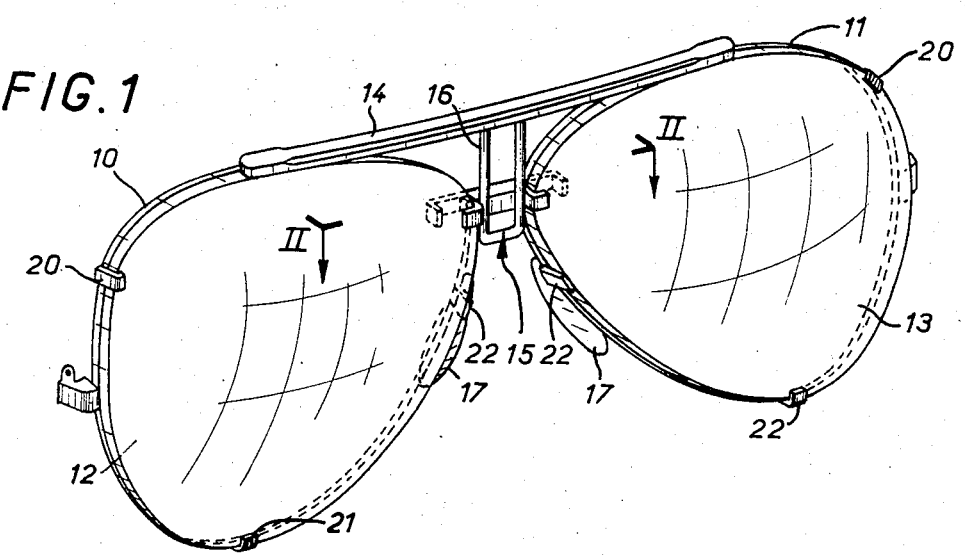
FIG. 1 is a perspective view of a frame front for eyeglasses or spectacles embodying the invention.

In the preferred embodiment illustrated in FIGS. 1–4, the frame front of the eyeglasses according to the invention comprises two lens supports or rims 10, 11 for receiving lenses 12, 13. In addition, a main or upper bridge member 14 connects the lens supports together and lies generally in the same planes thereof and a median bridge member generally designated by reference 15 is carried by the main bridge member 14 by a depending member 16 fixed to the main bar 14. The median bridge member 15 is located at a level intermediate the main bridge member 14 and the nosepieces 17, 18 carried by the lens suoports 10, 11.

Each lens support 10, 11 comprises a plurality of prongs 20, 21, 22 peripherally spaced on the temple area, lower area and bridge area, respectively. The temple and lower prongs 20 and 21 are adapted to urge the respective lenses against the lens supports whereas the prongs 22 are adapted to center the lenses with respect to the lens supports.

The median bridge member 15 generally comprises a bar 25 (see FIG. 2 in particular) disposed substantially parallel to the main bridge member 14. The depending member 16 on the main bridge member 14 carries the median bridge member 15. The median bridge member 15 extends between the lens supports 10, 11 and the terminal portions of the median bridge member 15 each comprise a retaining notch having an opening 28 defined by a frontal jaw 29 and a rear or lateral jaw 30. It is noted that the frontal jaw 29 comprises the free terminal end of a retaining tab 31 secured to the bar 25 as will be seen below.

Figure 2:
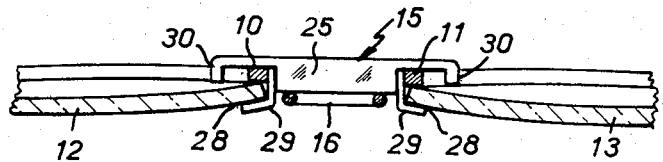
FIG. 2 shows a fragmentary sectional view taken on line II—II in FIG. 1 showing the median bridge member in detail.
Figure 2A:
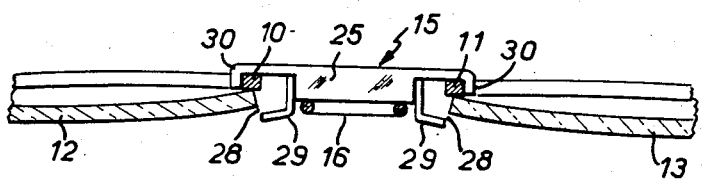
FIG. 2A shows a view similar to FIG. 2 with the lens supports at the limit positions for removing the lenses.
Figure 3:
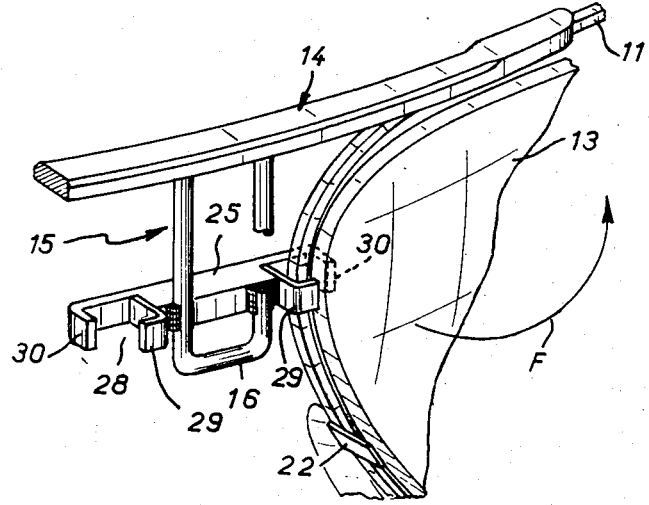
FIG. 3 illustrates in a fragmentary perspective view the mounting or removal of a lens on a lens support of the frame front of the eyeglasses or spectacles embodying the invention.

Thus the lens supports 10, 11 which are then disconnected from the median bridge member 15 may be displaced in the retaining notches from an abutment position at the back of the notches opposite the opening 28 (see FIG. 2) to a limit position defined by the lateral jaws 30 (see FIG. 2A). This displacement is permitted by the local resilient deformation of the main bridge member 14, the zone of deformation being defined substantially between the descending member 16 and a connecting zone between the main bridge member 14 and the lens supports 10, 11 respectively.

In the drawings the frame front of the eyeglasses is provided with colorless ophthalmic lenses 12, 13 of predetermined thickness. In order to replace the ophthalmic lenses with tinted lenses of the same thickness, one of the lenses 13 is disengaged from the retaining notch by swinging the corresponding lens support 11 upwardly and outwardly (see arrow F in FIG. 3) from its abutment position against the back of the retaining notches 28 (FIG. 2) to its limit position in engagement with the lateral jaw 30 (FIG. 2A) whereupon the edge of the lens is moved to the opening 28 of the retaining notch and therefore easily disengaged and removed. Another lens may then be positioned on the lens supports 10, 11 and thereafter engaged into the retaining notch by the displacement of the lens support from the abutment position to the limit position in the opposite direction to that described above and illustrated by arrow F in FIG. 3.

The identical steps are carried out on the other lens support to effect a corresponding lens change. It will be noted that the frame front according to the invention permits the wearer/user to change the lenses at any time desired, very simply and quickly.

Figure 4:
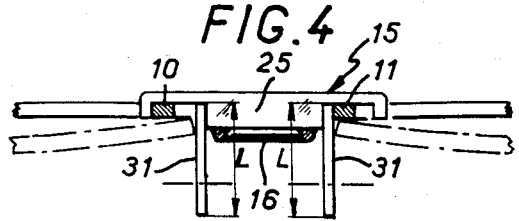
FIG. 4 is a sectional view of the median bridge member similar to that of FIG. 2 before sectioning and bending the prongs.

Reference will now be made to FIG. 4 in which the frontal jaws 29 are formed from initially straight retaining tabs 31 secured to the median bridge member by soldering, for example, the length of the tabs 31 being L. The length L of the tabs 31 is adjustable by the optician depending on the thickness of the lenses therefor. Thus, once the thickness of the lenses is known the tabs 31 are cut to the desired length and bent substantially at right angles, the terminal ends of the tabs 31 are disposed so that the resulting frontal jaws 29 cooperate with small marginal sectors of the respective lenses (see FIG. 2).

It should be noted that the foregoing method is suitable for frame fronts of eyeglasses or spectacles adapted to receive ophthalmic lenses the thicknesses of which are variable in substantial proportions. It permits the optician to adjust the length of the jaws 29 as a function of the thickness of the lenses and it permits the user to change the colorless lenses for tinted lenses, and vice versa.

When the frame front of the eyeglasses is intended exclusively for nonprescription tinted lenses which are of constant thickness, the tabs 31 are precut to the desired length before soldering on the bar 25. The wearer of such eyeglasses may therefore at will change lenses of one tint for lenses of another tint.

Figure 5:
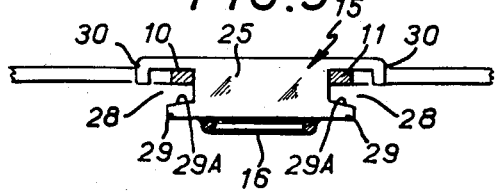
FIG. 5 is a view similar to that of FIG. 4 for an alternative embodiment of the median bridge member.

FIG. 5 illustrates an embodiment suitable for use with sunglasses with interchangeable lenses of different tints. In this embodiment the median bridge member 25 is of one-piece construction, the frontal jaws 29 and the lateral or rear jaws 30 being defined by the appropriate configuration of the bar.

It will be noted that the inner edge 29A of the frontal jaws 29 is inclined forwardly and outwardly to provide a clamping effect on the respective lenses. Such an embodiment is intended exclusively for sunglasses with nonprescription tinted lenses since the configuration of the median bridge member does not admit of accommodation of lenses of different thicknesses.

The invention is of course not limited to the illustrated and described embodiments but admits of various alternatives and modifications understood to those skilled in the art without departing from the scope of the appended claims. For example the depending member on the main bridge member may be of different construction. Similarly the median bridge member is secured to the depending member in the illustrated embodiments though obviously the median bridge member and the depending member may be formed as a single part, e.g., by casting.

What is claimed is:

1. A frame front for eyeglasses or spectacles, comprising two lens supports, a main bridge member interconnecting said lens supports, a median bridge member carried by said main bridge member extending between said lens supports, a plurality of protruding prongs provided on said lens supports for receiving lenses, said median bridge member being disconnected from said lens supports, two retaining notches being provided on said median bridge member, said lens supports being freely received in said retaining notches respectively, said lens supports being resiliently mounted on said main bridge member for displacement relative to said median bridge member to a lens mounting or removal position.

2. The frame front of claim 1, wherein said main bridge member defines means for resiliently mounting said lens supports.

3. The frame front of claim 1, comprising a depending member for suspending said median bridge from said main bridge member.

4. The frame front of claim 1, wherein said median bridge member comprises a bar substantially oarallel to said main bridge member.

5. The frame front of claim 4, and nosepieces mounted on said lens supports, wherein said bar is located at a level intermediate said main bridge member and said nosepieces.

6. The frame front of claim 4 or 5, wherein said retaining notches are provided at each terminal portion of said bar for limiting displacement of said lens supports relative to said median bridge.

7. The frame front of claim 6, wherein said retaining notches each comprise a back wall defining the abutment position of the associated lens support, said retaining notches permitting limited displacement of said lens supports generally in planes defined by said lens supports.

8. The frame front of claim 7, wherein said retaining notches each also comprise a frontal jaw and a lateral jaw spaced from said frontal jaw, said frontal jaw defining with said lateral jaw an opening therebetween.

9. The frame front of claim 8, wherein each of said frontal jaws comprises the terminal end of a bent-over tab secured to said bar defining said median bridge member.

10. The frame front of claim 8, wherein said lateral jaws and said frontal jaws are integral parts of sand bars.

11. The front face of claim 10, wherein said inner surface of said front jaw is forwardly and outwardly inclined for bearing against and retaining said lenses against their respective lens supports.

12. The front face of claim 3, wherein said depending member and said median bridge member are of one-piece construction.

* * * * *